(12) United States Patent
Rodriguez et al.

(10) Patent No.: US 9,792,588 B2
(45) Date of Patent: Oct. 17, 2017

(54) INFERRING PROFESSIONAL REPUTATIONS OF SOCIAL NETWORK MEMBERS

(71) Applicant: LinkedIn Corporation, Mountain View, CA (US)

(72) Inventors: Mario Sergio Rodriguez, Santa Clara, CA (US); Douglas Jobe Puett, Santa Clara, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

(21) Appl. No.: 14/788,031

(22) Filed: Jun. 30, 2015

(65) Prior Publication Data

US 2016/0292643 A1 Oct. 6, 2016

Related U.S. Application Data

(60) Provisional application No. 62/141,252, filed on Mar. 31, 2015.

(51) Int. Cl.
*G06F 17/30* (2006.01)
*G06Q 10/10* (2012.01)
*G06Q 50/00* (2012.01)

(52) U.S. Cl.
CPC ... *G06Q 10/1053* (2013.01); *G06F 17/30867* (2013.01); *G06Q 50/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0042483 | A1* | 3/2006 | Work | G06Q 10/00 101/91 |
| 2009/0112989 | A1* | 4/2009 | Anderson | G06Q 30/02 709/204 |
| 2012/0290950 | A1* | 11/2012 | Rapaport | H04L 51/32 715/753 |
| 2013/0073568 | A1* | 3/2013 | Federov | G06F 17/30867 707/749 |
| 2014/0201126 | A1* | 7/2014 | Zadeh | G06K 9/627 706/52 |
| 2014/0244531 | A1* | 8/2014 | Baldwin | G06Q 50/01 705/319 |
| 2014/0279722 | A1* | 9/2014 | Singh | G06F 17/30702 706/11 |

* cited by examiner

*Primary Examiner* — Mark A Fleischer
(74) *Attorney, Agent, or Firm* — Schwegman Lundberg & Woessner, P.A.

(57) ABSTRACT

Techniques for inferring a professional reputation for a member of an online social networking service are described. A recommendation graph is generated from professional recommendations submitted by members of the online social networking service for other members of the online social networking service. Using the generated recommendation graph, a reputation model is trained to learn a respective importance for each respective feature of a set of features of electronic profiles on the online social networking service. A professional reputation of a member of the online social networking service is estimated by applying the trained reputation model to a feature vector of the electronic profile of the member, producing a score representing the professional reputation of the member.

19 Claims, 8 Drawing Sheets

INFERRING PROFESSIONAL REPUTATIONS OF SOCIAL NETWORK MEMBERS

CLAIM OF PRIORITY

This patent application claims the benefit of priority under 35 U.S.C. §119(e) to U.S. Provisional Patent Application Ser. No. 62/141,252, filed on Mar. 31, 2015, entitled, "INFERRING PROFESSIONAL REPUTATIONS OF SOCIAL NETWORK MEMBERS," which is hereby incorporated by reference herein in its entirety.

TECHNICAL FIELD

The present disclosure relates generally to online social network services and specifically to inferring professional reputations of members of online social network services.

BACKGROUND

An online social networking service is a computer- or web-based application that enables users to establish links or connections with other people to share information with one another. Some online social networking services aim to enable friends and family to communicate with one another, while others are specifically directed to business users with a goal of enabling the sharing of business information. For purposes of the present disclosure, the terms "social network," "social networking service," "online social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks").

Many online social networking services prompt members to provide a variety of personal information, which may be displayed in a member's personal web page. Such information is commonly referred to as personal profile information, or simply "profile information," and when shown collectively, it is commonly referred to as a member's "profile." For example, with some of the many online social networking services in use today, the personal information that is commonly requested and displayed includes a member's age, gender, interests, contact information, home town, address, the name of the member's spouse and/or family members, etc. With some online social networking services, such as some electronic professional networks, a member's personal information may include information commonly included in a professional resume or curriculum vitae, such as information about a person's education, employment history, skills, professional organizations, and so on. Some electronic professional networks allow a member to write a professional recommendation for another member.

BRIEF DESCRIPTION OF THE DRAWINGS

Some embodiments are illustrated by way of example and not limitation in the figures of the accompanying drawings.

DETAILED DESCRIPTION

Figure 1:
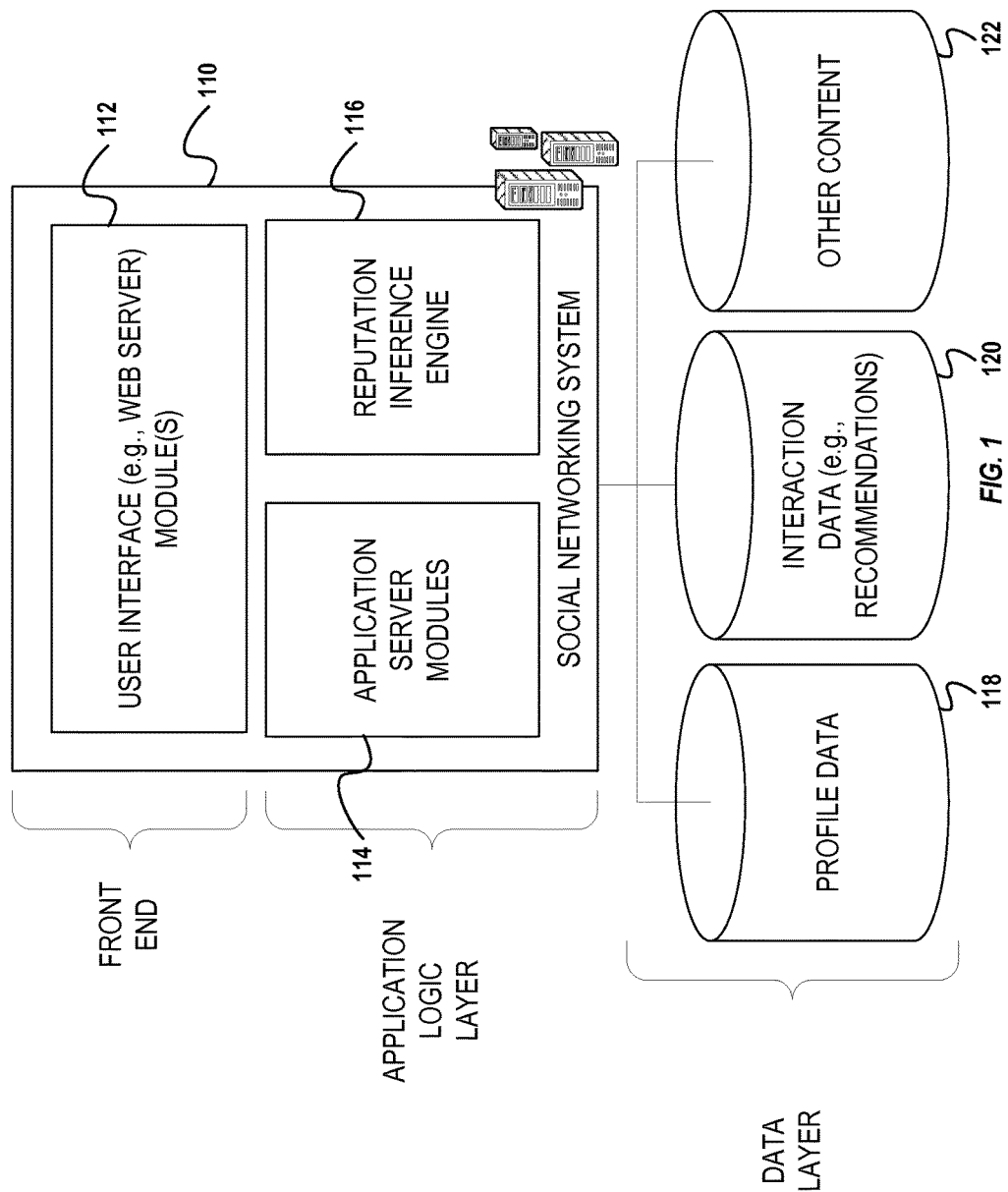
FIG. 1 is a block diagram illustrating various components of an online social networking service with a reputation inference engine for inferring a professional reputation for a member, according to an embodiment.

The present disclosure describes methods and systems for inferring a professional reputation for a member of an online social networking service. In the following detailed description, for purposes of explanation, numerous specific details are set forth in order to provide a thorough understanding of the various aspects of the presently disclosed subject matter. However, it will be evident to those skilled in the art that the presently disclosed subject matter may be practiced without these specific details. In other instances, well-known methods, procedures, and components have not been described in detail so as not to obscure the presently disclosed subject matter.

Social networks may be regarded as networks of people connected by trust, shared values, and/or a mutual need for cooperation. Social communities, cooperative business relationships, and professional associations are all examples of social networks. Social networking systems create social networks to find business partners, clients, and people with shared interests and values. Such systems are also used to share knowledge, build and strengthen communities, build teams, and map and analyze complex organizational networks.

Online social networking services are online communities where people share and use these contacts to find new friends, romantic interests, and business partners or employees, providing an easier and more organized way to manage and develop one's social network. A person may receive an invitation from a friend or colleague to join an online social networking service, or may decide to join independently. To join an online social networking service, a person (e.g., "user") must set up an account with the online social networking service; the account typically includes an account name and password, and the user may be required to set up an electronic profile, which lists activities, interests, or resume details such as past employment positions and experiences. The user can then add contacts to his or her network; those contacts can add their contacts, etc. A user can then use his/her network to search for a new friend, romantic interest, business partner, or employee. Most online social networking services show the links for each potential target listed in a search, so the user knows how far removed the target is. The target may be a first-degree contact, meaning he/she is within the user's immediate friends and contacts, or he/she may be a second, third, or further removed contact.

In addition, many of these online social networking services have some sort of reputation system whereby a user can either write a testimonial about a person in their network or rate that person based on one or more characteristics. One purpose of a reputation system is to build confidence and trust in and between users of the online social networking service. Reputation systems store reference information plus evaluations (e.g., recommendations) and endorsements in electronic databases to be associated with users' profiles and resumes.

Some online social networking services allow members of the community to write a testimonial or "recommendation" of certain people in their network of contacts. For example, a user, Jane, may know that one of her contacts, Bob, is looking for a job. Since Jane has previously worked with Bob and knows him to be an excellent market research analyst as well as a hard worker and easy to get along with, she writes a recommendation for Bob; upon approval of the recommendation from Bob, Jane's recommendation is included as part of Bob's electronic profile. When a potential employer searches the online social networking service and comes across Bob's online profile, the employer can see Jane's recommendation of Bob in Bob's profile.

Recruiters, employers, and other users of an online social networking service sometimes want to know another user's reputation (e.g., level of authority or seniority) beyond what the user and others wrote about the user. For example, a recruiter may want to know how "senior" a user is. Various methods of inferring a user's seniority exist. Seniority may be inferred by a user's title. For example, within a given organization, a user with the title "senior software engineer" is likely to be more senior than a user with the title "software engineer". However, comparing titles from different organizations or from different industries may not yield meaningful results. Seniority may be inferred based on time, such as length of employment with an organization, length of time in an industry, length of time in the workforce, length of time since graduating from college, etc. Although not difficult to calculate, these metrics are too coarse for individual users to be meaningful because users switch employers and industries, go back to school, etc.

A better approach for gauging seniority is to leverage the recommendations within the electronic network by training a reputation model to learn which features of electronic profiles are good indicators of seniority, and then estimating seniority for a user by applying the trained reputation model to an electronic profile of the user. To do this, a "recommendation graph" describing the recommendations amongst users, is generated. Each vertex in the recommendation graph represents a user profile on the online social networking service, and each edge in the recommendation graph represents a recommendation from one user to another user.

In an embodiment, when a recommending user (e.g., "recommender") writes a recommendation for another user (e.g., "recommendee"), the recommending user is prompted to choose a label indicating the nature of the relationship between the recommender and recommendee. From this label, relative levels of authority and seniority between the recommender and recommendee are ascertained.

FIG. 1 is a block diagram illustrating various components of an online social networking service 110 with a reputation inference engine 116 for inferring a professional reputation for a member, according to an embodiment. As shown in FIG. 1, the online social networking service 110 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the disclosure with unnecessary detail, various functional modules and engines that are not germane to conveying an understanding of the disclosed subject matter have been omitted from FIG. 1. However, a skilled artisan will readily recognize that various additional functional modules and engines may be used with an online social networking service 110 such as that illustrated in FIG. 1, to facilitate additional functionality that is not specifically described herein. Furthermore, in an embodiment, the various functional modules and engines depicted in FIG. 1 reside on a single server computer; in another embodiment, the various functional modules and engines depicted in FIG. 1 are distributed across several server computers in various arrangements.

As shown in FIG. 1, the front end consists of a user interface module (e.g., a web server) 112, which receives requests from various client computing devices (not shown), and communicates appropriate responses to the requesting client computing devices. In an embodiment, the user interface module(s) 112 receive requests in the form of Hypertext Transport Protocol (HTTP) requests, or other web-based, application programming interface (API) requests. The application logic layer includes various application server modules 114, which, in conjunction with the user interface module(s) 112, generates various user interfaces (e.g., web pages) with data retrieved from various data sources in the data layer. In an embodiment, individual application server modules 114 are used to implement the functionality associated with various services and features of the social networking service. For example, the ability to infer or estimate a professional reputation for a member of the online social networking service 110—is a service implemented in an independent application server module 114. Similarly, other applications or services that utilize the reputation inference engine 116 will be embodied in their own application server modules 114.

As shown in FIG. 1, the data layer includes several databases, such as a database 118 for storing profile data (e.g., member profile data), database 120 for storing interaction data (e.g., member recommendations), and database 122 for storing other content (e.g., job listings, interest groups, companies, advertisements, events, news, discussions, tweets, questions and answers, etc.)

When a person initially registers to become a member of the social networking service, the person is prompted to provide some personal information, such as his or her name, age (e.g., birthdate), gender, interests, contact information, home town, address, the names of the member's spouse and/or family members, educational background (e.g., schools, majors, etc.), employment history, skills, professional organizations, and so on. This information is stored, for example, in profile database 118.

Once registered, a member may invite other members, or be invited by other members, to connect via the social networking service. A "connection" may require a bi-lateral agreement by the members, such that both members acknowledge the establishment of the connection. Similarly, a member may elect to "follow" another member. In contrast to establishing a "connection," the concept of "following" another member typically is a unilateral operation, and in an embodiment, does not require acknowledgement or approval by the member that is to be followed. In an embodiment, when one member follows another, the member who is following receives automatic notifications about various activities undertaken by the member being followed.

Figure 2:
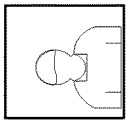
FIG. 2 illustrates an example of a user interface for initiating a professional recommendation for a member of an online social networking service, according to an embodiment.

FIG. 2 illustrates an example of a user interface 200 for initiating a professional recommendation for a member of an online social networking service 110, according to an embodiment. The user interface 200 is representative of a web page, but could also presented via another application (e.g., such as on a mobile device, phone, or tablet device), and illustrates an example of a member profile for a member named, "Joe Hansen." On the left portion of the user interface, various member profile information (e.g., "features") for the member is presented. The features presented include age, gender, industry, job title, location, employer, employer size, position in the recommendation graph, title-based seniority, title-based seniority of similar members, length of professional career, length of membership in the online social networking service 110, and degree obtained, industry, etc. If a viewer of the profile (e.g., another member of the social networking service) would like to initiate a professional recommendation for Joe Hansen, the viewer can simply select the hyperlink or button 202 labelled, "Recommend Joe." Upon selecting the hyperlink or button 602, a new user interface (e.g., web page) is presented to the viewing user, such as the user interface shown in FIG. 3.

Figure 3:
FIG. 3 illustrates an example of a user interface for composing and submitting a professional recommendation for a member of an online social networking service, according to an embodiment.

FIG. 3 illustrates an example of a user interface 300 for composing and submitting a professional recommendation for a member of an online social networking service 110, according to an embodiment. In FIG. 3, user interface 300 illustrates an example of a form for composing and submitting a professional recommendation for the member named, "Joe Hansen."

In an embodiment, as part of the recommendation composition process, the recommending member (e.g., "recommender") is prompted to select a "basis of recommendation" 302, which is a summary of the recommender's professional relationship with the member being recommended (e.g., "recommendee"). The recommender is presented with several options for the "basis of recommendation" 302, such as "managed recommendee directly", "reported directly to recommendee", "managed recommendee indirectly", "reported indirectly to recommendee", "senior to recommendee, but not in recommendee's chain of command", "junior to recommendee, but recommendee not in chain of command", "worked with recommendee in the same group", and "worked with recommendee in different groups," etc.

In an embodiment, the recommender is prompted to write a brief description 304 for the recommendation of the recommendee. The brief description should describe the nature of the relationship between the recommender and the recommendee, and should include more detail than simply the chosen basis of the recommendation 302.

After the recommender has completed the recommendation, the recommender selects the "submit recommendation" button or hyperlink 306 to submit the recommendation to the online social networking service 110. In an embodiment, upon a recommendee accepting a recommendation submitted by a recommendee, the brief description 304 written by the recommender for the recommendee will appear on the electronic profile of the recommendee.

Figure 4:
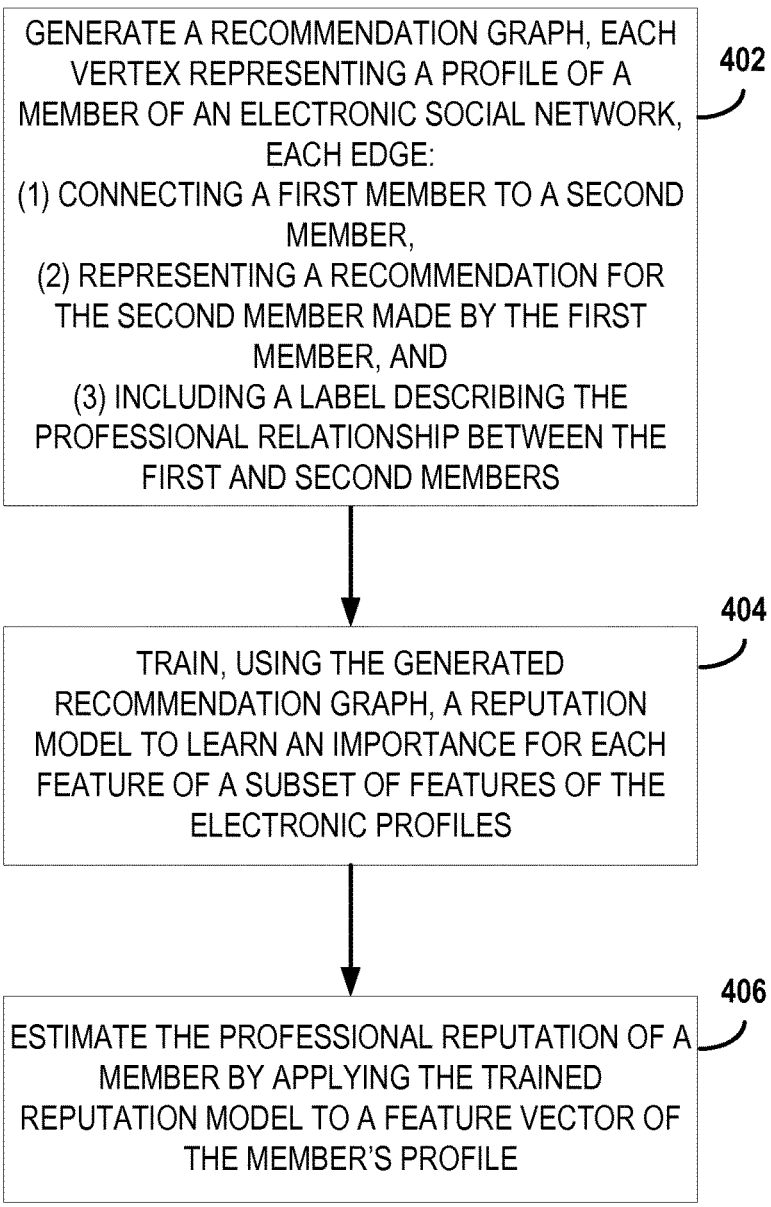
FIG. 4 is a flow diagram illustrating an example of operations involved in a method of inferring a professional reputation of a member of an online social networking service, according to an embodiment.

FIG. 4 is a flow diagram illustrating an example of operations involved in a method 400 of inferring a professional reputation of a member of an online social networking service 110, according to an embodiment. A recommendation graph is generated (operation 402) from a set of existing recommendations in the online social networking service 110. In an embodiment, the set of recommendations can be selected based on industry, company, employment type, geographic region, etc.

In an embodiment, the recommendation graph is generated such that each vertex of the recommendation graph represents a member profile within the online social networking service 110, and each edge in the recommendation graph connects a pair of vertices and represents one recommendation for one vertex in the pair (e.g., the recommendee), written by the other vertex in the pair (e.g., the recommender). Each edge includes a label corresponding to the basis of the recommendation 302 chosen by the recommender when the recommender submitted the recommendation.

Using the generated recommendation graph, a reputation model is trained (operation 404) to learn an importance of a feature of an electronic profile for inferring a professional reputation for an electronic profile having the feature. Examples of features of an electronic profile may include age, gender, industry, job title, location, employer, employer size, position in the recommendation graph, title-based seniority, title-based seniority of similar members, length of professional career, length of membership in the online social networking service 110, and degree obtained, industry, etc. A professional reputation of a member is estimated (operation 406) by applying the trained reputation model to a feature vector of the member's profile (e.g., a vector containing some or all of the features of the member's profile, including inferred features). In an embodiment, the estimated professional reputation is a level of seniority of the member, while in another embodiment, the estimated professional reputation of the member is represented as a numeral or a numerical score.

Figure 5:
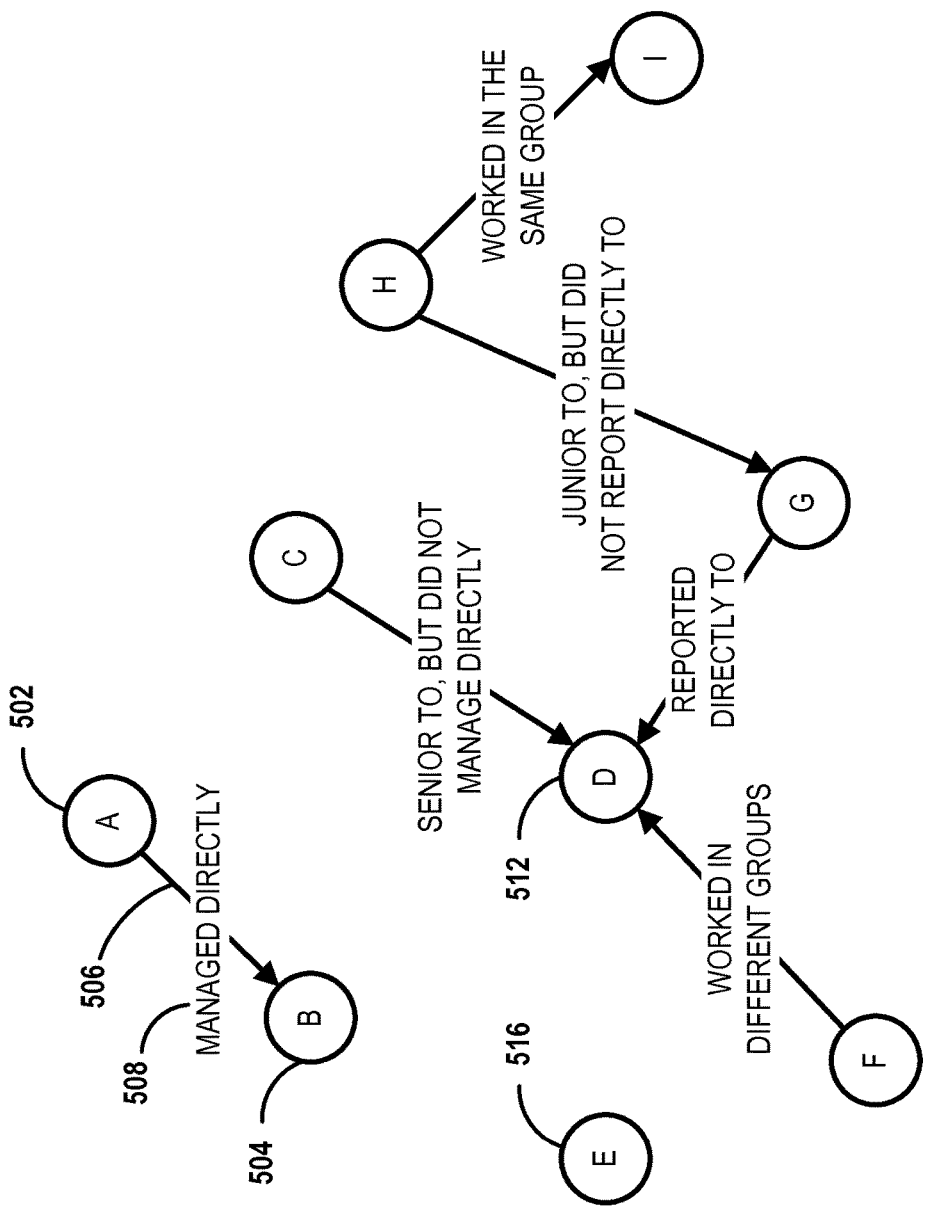
FIG. 5 illustrates an example of a generated recommendation graph, according to an embodiment.

FIG. 5 illustrates an example of a generated recommendation graph 500, according to an embodiment. In the illustrated example, the generated recommendation graph 500 includes nine vertices labeled A through F; each vertex represents a member profile on an online social networking service 110.

The illustrated recommendation graph 500 also includes six edges, representing six recommendations amongst the member profiles A-F. Each edge includes a label corresponding to the "basis of recommendation" selected when the recommendation was submitted. Each edge is directed, with the direction indicating increasing professional reputation (e.g., seniority); thus, regardless of which member is the recommender and the recommendee, the edge between a recommender vertex and a recommendee vertex emanates from the "less senior" vertex to the "more senior" vertex. The direction of each edge is at least partially determined by the label assigned to the edge when the recommendation corresponding to the edge was created. For example, edge is directed from vertex A 502 to vertex B 504, and has a label "managed directly" 508; thus, the member represented by vertex B 504 is "more senior" than the member represented by vertex A 502, despite the recommendation having been written by the member represented by vertex B 504 for the member represented by vertex A 502.

Although FIG. 5 is a visual illustration of the generated recommendation graph 500, it is not necessary to generate a visual representation of the graph; any data structure representation of the graph that includes the graph's data (e.g., vertices, edges, labels, etc.) is sufficient. As illustrated in FIG. 5, generated recommendation graph 500 is a disconnected graph; that is, some vertices may not have a path to other vertices. For example, although vertex A 502 and vertex B 504 are connected by edge 506, neither vertex is connected to any other vertex. As another example, vertex E 516 is not connected to any vertex.

Figure 7:
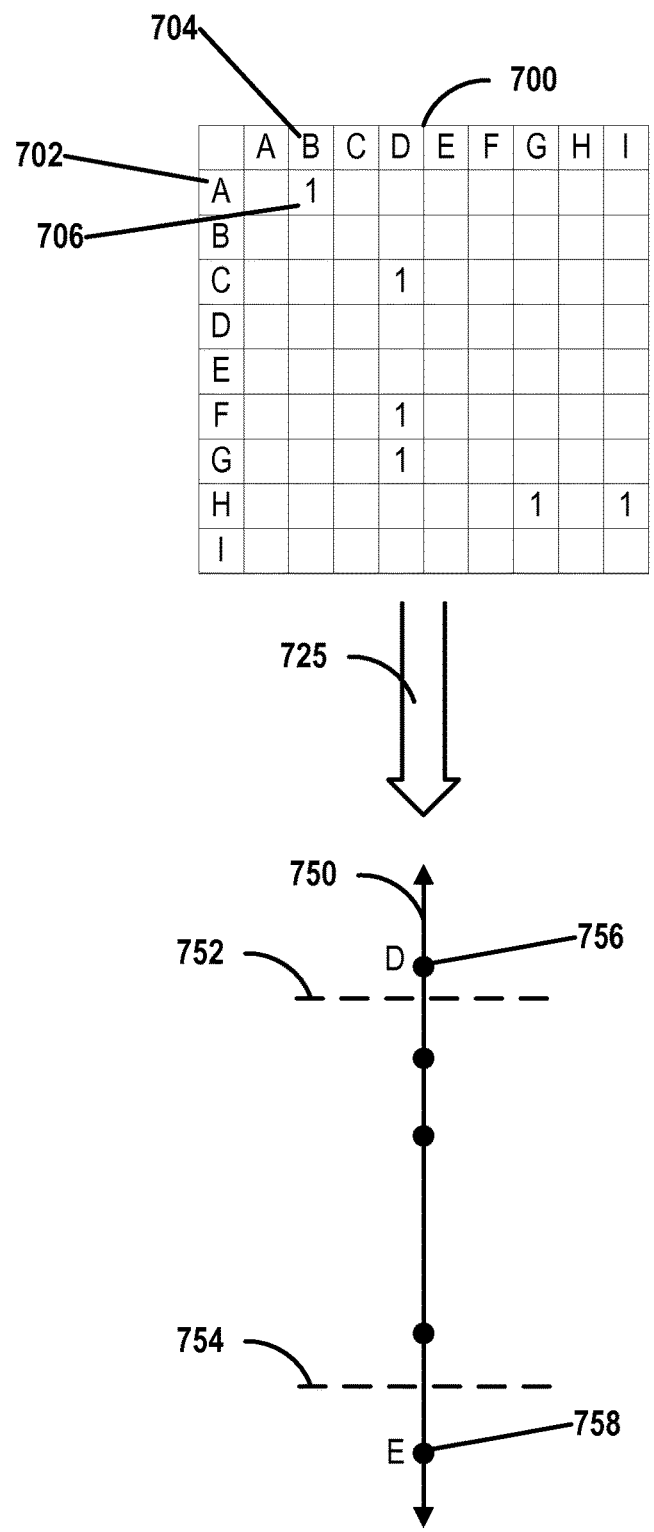
FIG. 7 illustrates another example of using a generated recommendation graph to train a reputation model, according to an embodiment.

In an embodiment, after generating the recommendation graph 500, a reputation model is trained to learn an importance of a feature of an electronic profile for inferring a professional reputation for an electronic profile having the feature. Training the reputation model can be accomplished using machine learning algorithms, such as artificial neural networks, Bayesian statistics, support vector machines, linear classifiers, etc. Two general approaches for training the reputation model will be described. The first approach for training the reputation model is based on pairwise-learning using recommender-recommendee vertex pairs from the generated recommendation graph 500. The second approach for training the reputation model is based on comparing the individual nodes of the generated recommendation graph 500, and is illustrated in FIG. 7.

Training Reputation Model Using Recommender-Recommendee Pairs

In an embodiment, the reputation model is trained by providing to a classifier a set of recommender-recommendee vertex pairs from the generated recommendation graph 500. In an embodiment, each recommender-recommendee vertex pair includes a feature vector that includes features from the electronic profile represented by the recommender vertex and the electronic profile represented by the recommendee vertex. The feature vector for each recommender-recommendee vertex pair includes data representing interactions (e.g., recommendations, endorsements, referrals, messages, comments, etc.) between the recommender and the recommendee.

In an embodiment, the classifier uses an algorithm (e.g., a linear programming algorithm such as criss-cross) to minimize pairwise inversions (e.g., incorrect reputation classifications between two members) between the data used for training the reputation model versus data that is used to test the accuracy of the trained reputation model. After the reputation model has been trained, the reputation model is converted into a feature importance vector, which can be applied to a member's feature vector to estimate the professional reputation (e.g., seniority) of the member. A feature importance vector is an n-length vector of feature importances, including an $importance_0$ for $feature_0$, an $importance_1$ for $feature_1$ ... and an $importance_n$ for $feature_n$, where an electronic profile on the online social networking service 110 can have m≤n features. An importance for a feature in the feature importance vector is one of a weight, a percentage, or a function, which may be dependent upon values for one or more other features.

Figure 6:
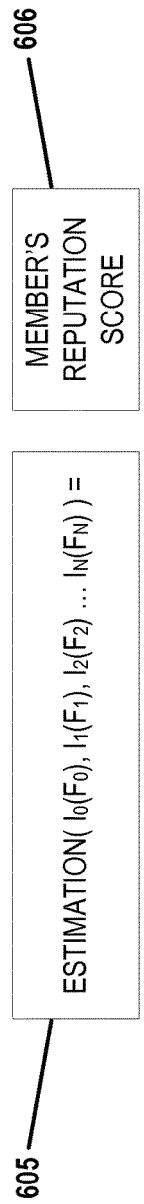
FIG. 6 illustrates an example of estimating a professional reputation of a member by applying a trained reputation model to a member's feature vector, according to an embodiment.

FIG. 6 illustrates an example 600 of estimating a professional reputation of a member by applying a trained reputation model to a member's feature vector, according to an embodiment. To estimate a member's professional reputation, the feature importance vector 602 (the n-length vector of weights representing the trained reputation model) is applied 605 to the member's feature vector 604; the result is a numerical score 606 of the member's professional reputation. The numerical scores 606 are relative, meaning that the numerical score 606 for one member's professional reputation only has relevance when compared to the numerical score 606 for another member's professional reputation.

Training Reputation Model by Comparing Individual Nodes

FIG. 7 illustrates another example of using a generated recommendation graph 500 to train a reputation model, according to an embodiment. As illustrated in FIG. 7, generated recommendation graph 500 is represented as a matrix 700, which lists the vertices of generated recommendation graph 500 on both the vertical and horizontal axes. Each directed edge in generated recommendation graph 500 is represented by a "1" in the entry corresponding to the source vertex on the vertical axis and the destination vertex on the horizontal axis. For example, edge 506, which has vertex A 502 as its source and vertex B 504 as its destination, is represented in matrix 700 by a "1" in entry 706, which corresponds to entry A 702 on the vertical axis and entry B 704 on the horizontal axis.

In an embodiment, the reputation model is created by projecting 725 generated recommendation graph 500 (e.g., matrix 700) onto one dimension, such as the dimension represented by axis 750, by using one or more dimensionality reduction techniques. Each dimensionality reduction technique exposes different aspects of the structure of the graph and, therefore, exposes different aspects of the relationship between the nodes in the graph. The specific meaning of the dimension(s), onto which the graph is projected, also depends upon how the graph is defined as a matrix (e.g., an adjacency matrix, a transition matrix, etc.) Examples of possible dimensionality reduction techniques include:

PageRank: gives a measure of a node's network centrality within the network. Nodes with a higher PageRank score are more influential than nodes with a lower PageRank score.

Hyperlink-Induced Topic Search (HITS): Unlike PageRank, which projects a graph onto one-dimension, HITS projects a graph onto two dimensions. For each node, HITS calculates two scores: an authority score, which estimates the value of the node itself, and a hub score, which estimates the value of the node's links to other nodes.

Other dimensionality reduction techniques, such as:
Principal Component Analysis (PCA)
Non-negative Matrix Factorization (NNMF)
Independent Component Analysis (ICA)
Random Projection (RP)

The relationships between these dimensionality reduction techniques and PageRank/HITS are discussed in the paper titled, "A Comparison of Dimensionality Reduction Techniques for Web Structure Mining" (Chikhi, N. F.; Rothenburger, B. & Aussenac-Gilles, N. (2007), A Comparison of Dimensionality Reduction Techniques for Web Structure Mining, in 'Web Intelligence', IEEE Computer Society, pp. 116-119).

In an embodiment, the algorithm used to project 725 the generated recommendation graph 500 onto one dimension assigns a score to each vertex (e.g., member) of the generated recommendation graph 500. Many techniques may be used to project the recommendation graph 500 onto a lower dimensionality space. A subset of such methods includes algorithms for measuring node centrality in the graph, examples of which include: PageRank and HITS. PageRank outputs one score per node, whereas HITS outputs two scores per node: one score measuring "hubness" and one score measuring authoritativeness. A node's score represents a "reputation" of the member represented by the node. None of these scores individually is the "true" reputation, but they reflect aspects of reputation that may be desirable for a particular embodiment. For example, an embodiment may value authoritativeness higher than hubness.

The recommendation graph 500 is a subset of the larger "social graph," which encompasses all members of the online social networking service 110. Reputation may be extended to the social graph by using the preferred signal (e.g. authoritativeness or hubness) as a signal in a supervised machine-learning algorithm (e.g., linear/nonlinear regression, logistic regression, beta regression, etc.)

One example of using the scores in a model includes ranking based on the score and using the top scoring nodes and lowest scoring nodes as positive examples and training examples in a regression/ranker algorithm. For example, these scores are plotted on the one dimension to obtain a relative ranking of the members in the generated recommendation graph 500. Members above an upper threshold 752 of the dimension are considered to be "very senior," while members below a lower threshold 754 of the dimension are considered to be "very junior." In the example illustrated in FIG. 7, vertex D 512 of FIG. 5 is plotted as dot 756, signifying that the member represented by vertex D 512 is very senior, while vertex E 516 of FIG. 5 is plotted as dot 758, signifying that the member represented by vertex E 516 is very junior.

How the score is used depends on the choice of supervised learning algorithm. For example, PageRank scores can be used as target signals in a linear/nonlinear regression model, can be discretized (top and lowest scores) to be used in a classifier (e.g., logistic regression), or they can be converted to a percentile and used in a beta regression algorithm.

In an embodiment, after the generated recommendation graph 500 has been projected 725 onto one dimension, a training set composed of highly reputable members and least reputable members is used to train a logistic regression classifier/ranker to calculate a feature importance vector 602. After the feature importance vector 602 has been calculated, the feature importance vector is the output of whatever supervised learning algorithm is chosen (e.g., linear/nonlinear regression, logistic regression, beta regression, etc.)

For example, assume 10 nodes exist in the wider social-professional graph. Each of those 10 nodes has a feature vector associated with it, which contains values for the following features: total years of experience, seniority level of the title, total years of experience in jobs similar to the current job, size of the company, number of profile views, etc. To capture a notion of professional reputation (which is correlated with seniority), all of the features may be combined into a single score by using the signal from the recommendation graph (e.g. PageRank, hubness, or authoritativeness). Only a subset of the wider social-professional recommendation graph will be a part of the recommendation graph. For example, assume only four of the 10 nodes are part of the recommendation graph. The feature weights can be learned based on the subset, and then those feature weights can be applied to the feature vector of the remaining six nodes in the wider social-professional graph.

The feature importance vector 602 is used to estimate a professional reputation for a member as has been described in FIG. 6. In an embodiment, instead of calculating a numerical score for a member's professional reputation, applying the feature importance vector 602 is to the member's feature vector results in a probability that a member having those features in the member's feature vector is very reputable.

In an embodiment using HITS as a dimensionality reduction technique, one dimension (e.g., either the authority dimension or the hub dimension) can be chosen to train the logistic regression model. HITS dimensionality reduction techniques can also use both dimensions to cluster the nodes into two groups, and then use those two groups to train the logistic regression model. The motivation for using different dimensionality reduction techniques is to use whichever one is most representative of the kind of reputation to be quantified (e.g. authority versus hub).

In an embodiment, estimated professional reputations are used to rank authors of content on the online social networking service 110. This is done by aggregating the reputation of each member who has engaged with a piece of content and interpreting the aggregate reputation as the collective reputation of the piece of content. This aggregation can be applied to detect SPAM content (e.g., content that is unsolicited, undesired, or illegal). This process helps to differentiate between high quality content and low-quality content, based on the assumption that high-quality content will be written by people with higher reputations than will low-quality content; this may be because people with higher reputations are less likely to endorse low-quality content because they have more to lose. Aggregation of member reputations to infer the reputation of a piece of content can be used to determine a receptive target audience for the piece of content.

Figure 8:
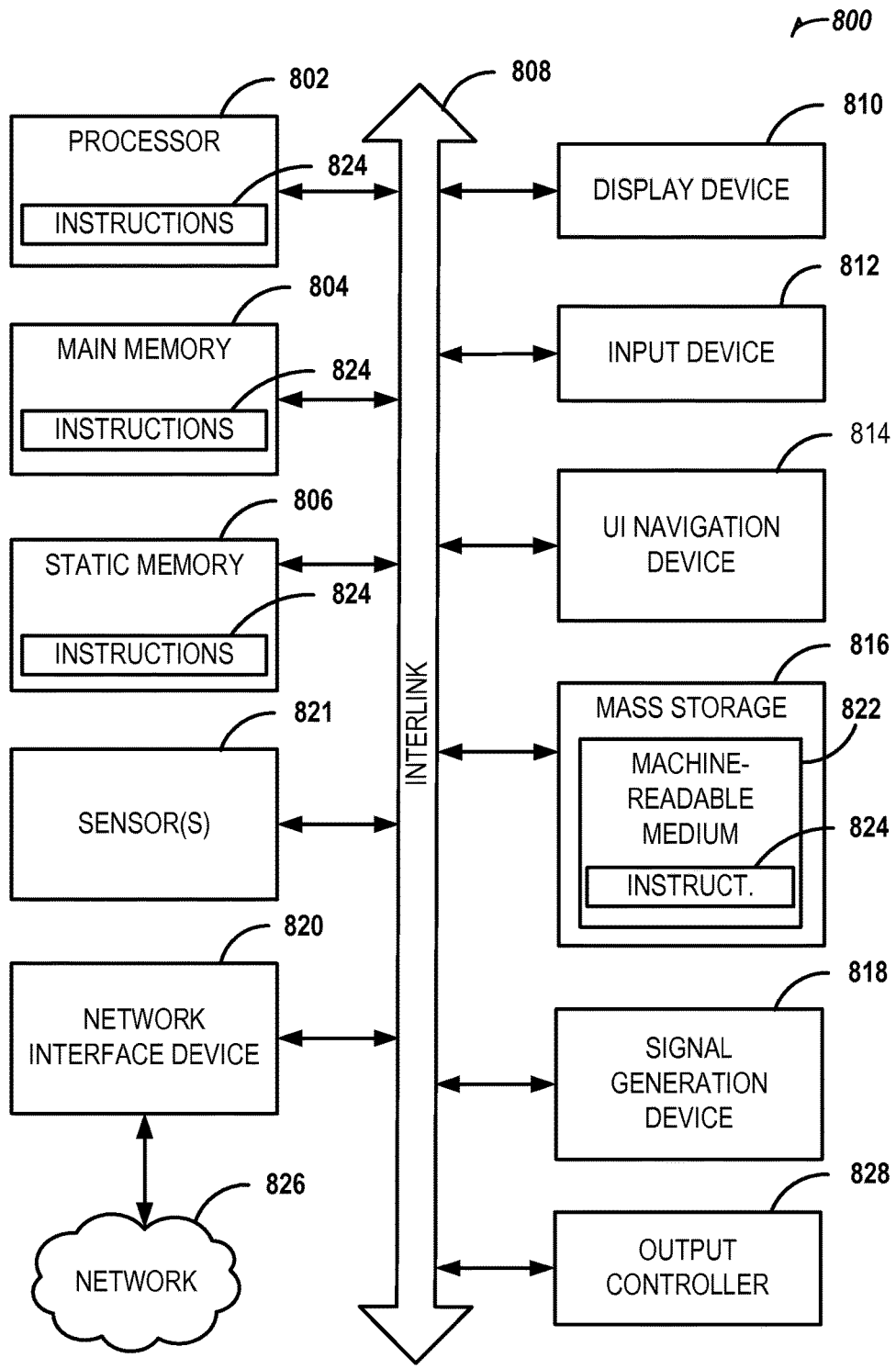
FIG. 8 is a block diagram illustrating an example of a machine, upon which any one or more example embodiments may be implemented.

FIG. 8 is a block diagram illustrating an example of a machine 800, upon which any one or more example embodiments may be implemented. In alternative embodiments, the machine 800 may operate as a standalone device or may be connected (e.g., networked) to other machines. In a networked deployment, the machine 800 may operate in the capacity of a server machine, a client machine, or both in a client-server network environment. In an example, the machine 800 may act as a peer machine in a peer-to-peer (P2P) (or other distributed) network environment. The machine 800 may implement or include any portion of the social network service from FIG. 3, and may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, although only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations, etc.

Examples, as described herein, may include, or may operate by, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine-readable media.

Although the machine-readable medium 822 is illustrated as a single medium, the term "machine-readable medium" may include a single medium or multiple media (e.g., a centralized or distributed database, and/or associated caches and servers) configured to store the one or more instructions 824.

The term "machine-readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Additional Notes & Example Embodiments

Example 1 includes subject matter (such as a method, means for performing acts, machine readable medium including instructions that when performed by a machine cause the machine to performs acts, or an apparatus to perform) comprising: using one or more computer processors to perform operations of: generating, for an online social networking service having members with individual electronic profiles having features, a recommendation graph including a plurality of vertices and a plurality of edges, each vertex representing a member, each edge representing a recommendation of a recommendee member by a recommender member, the recommendation accepted by the recommendee member; training, using the generated recommendation graph, a reputation model to learn a respective importance for each respective feature of a subset of features of the electronic profiles; and estimating the professional reputation of a member by applying the trained reputation model to a feature vector of the member, the feature vector including features included in the subset of features, wherein applying includes adjusting a respective feature value in the feature vector of the member by a respective weight corresponding to the respective learned importance of the respective feature.

In Example 2, the subject matter of Example 1 may include, wherein an edge in the plurality of edges includes a label designated by the recommender member and accepted by the recommendee member; wherein the label describes a professional relationship between the recommender member and the recommendee member; and wherein the label is one of "managed recommendee directly", "reported directly to recommendee", "managed recommendee indirectly", "reported indirectly to recommendee", "senior to recommendee, but not in recommendee's chain of command", "junior to recommendee, but recommendee not in chain of command", "worked with recommendee in the same group", and "worked with recommendee in different groups".

In Example 3, the subject matter of any one of Examples 1 to 2 may include, wherein the subset of features for an electronic profile of a member of the online social networking service includes at least one of age, gender, industry, job title, location, employer, employer size, position in the recommendation graph, title-based seniority, title-based seniority of similar members, length of professional career, length of membership in the online social networking service, and degree obtained.

In Example 4, the subject matter of any one of Examples 1 to 3 may include, wherein the training includes providing a plurality of recommender-recommendee vertex pairs to a classifier, each recommender-recommendee vertex pair in the plurality connected by an edge in the recommendation graph and features of the recommender member and features of the recommendee member.

In Example 5, the subject matter of any one of Examples 1 to 4 may include, wherein the training includes providing a plurality of feature vectors to a classifier, each respective feature vector features of a respective recommender member and features of a respective recommendee member, the respective recommender member connected by an edge to the respective recommendee member; and features of interactions between the respective recommender member and the respective recommendee member.

In Example 6, the subject matter of any one of Examples 1 to 5 may include, wherein the estimated professional reputation of the member is a level of seniority of the member.

In Example 7, the subject matter of any one of Examples 1 to 6 may include, wherein the plurality of vertices of the generated recommendation graph includes only members having an electronic profile on the online social networking service indicating involvement in a particular industry.

In Example 8, the subject matter of any one of Examples 1 to 7 may include, wherein the estimate of the professional reputation of the member is a numerical score.

In Example 9, the subject matter of any one of Examples 1 to 8 may include, wherein training includes projecting the generated recommendation graph onto one dimension, the projecting performed using at least one of principal component analysis and the PageRank algorithm.

In Example 10, the subject matter of any one of Examples 1 to 9 may include, wherein projecting the generated recommendation graph onto one dimension includes providing the generated recommendation graph to a classifier.

In Example 11, the subject matter of any one of Examples 1 to 10 may include, wherein projecting includes the classifier using logistic regression to project the generated recommendation graph onto one dimension.

Example 12 includes subject matter (such as a device, apparatus, or machine) comprising: a machine-readable medium including machine-readable instructions which, when executed by a processor of a machine, cause the machine to perform operations comprising: generating, for an online social networking service having members with individual electronic profiles having features, a recommendation graph including a plurality of vertices and a plurality of edges, each vertex representing a member, each edge representing a recommendation of a recommendee member by a recommender member, the recommendation accepted by the recommendee member; training, using the generated recommendation graph, a reputation model to learn a respective importance for each respective feature of a subset of features of the electronic profiles; and estimating the professional reputation of a member by applying the trained reputation model to a feature vector of the member, the feature vector including features included in the subset of features, wherein applying includes adjusting a respective feature value in the feature vector of the member by a respective weight corresponding to the respective learned importance of the respective feature.

In Example 13, the subject matter of Example 12 may include, wherein an edge in the plurality of edges includes a label designated by the recommender member and accepted by the recommendee member; wherein the label describes a professional relationship between the recommender member and the recommendee member; and wherein the label is one of "managed recommendee directly", "reported directly to recommendee", "managed recommendee indirectly", "reported indirectly to recommendee", "senior to recommendee, but not in recommendee's chain of command", "junior to recommendee, but recommendee not in chain of command", "worked with recommendee in the same group", and "worked with recommendee in different groups".

In Example 14, the subject matter of any one of Examples 12 to 13 may include, wherein the subset of features for an electronic profile of a member of the online social networking service includes at least one of age, gender, industry, job title, location, employer, employer size, position in the recommendation graph, title-based seniority, title-based seniority of similar members, length of professional career, length of membership in the online social networking service, and degree obtained.

In Example 15, the subject matter of any one of Examples 12 to 14 may include, wherein the estimated professional reputation of the member is a level of seniority of the member.

In Example 16, the subject matter of any one of Examples 12 to 15 may include, wherein the plurality of vertices of the generated recommendation graph includes only members having an electronic profile on the online social networking service indicating involvement in a particular industry.

In Example 17, the subject matter of any one of Examples 12 to 16 may include, wherein the estimate of the professional reputation of the member is a numerical score.

In Example 18, the subject matter of any one of Examples 12 to 17 may include, wherein training includes projecting the generated recommendation graph onto one dimension, the projecting performed using at least one of principal component analysis and the PageRank algorithm.

Example 19 includes subject matter (such as a CRM) comprising: generating, for an online social networking service having members with individual electronic profiles having features, a recommendation graph including a plurality of vertices and a plurality of edges, each vertex representing a member, each edge representing a recommendation of a recommendee member by a recommender member, the recommendation accepted by the recommendee member; training, using the generated recommendation graph, a reputation model to learn a respective importance for each respective feature of a subset of features of the electronic profiles; and estimating the professional reputation of a member by applying the trained reputation model to a feature vector of the member, the feature vector including features included in the subset of features, wherein applying includes adjusting a respective feature value in the feature vector of the member by a respective weight corresponding to the respective learned importance of the respective feature.

In Example 20, the subject matter of Example 19 may include, wherein an edge in the plurality of edges includes a label designated by the recommender member and accepted by the recommendee member; wherein the label describes a professional relationship between the recommender member and the recommendee member; and wherein the label is one of "managed recommendee directly", "reported directly to recommendee", "managed recommendee indirectly", "reported indirectly to recommendee", "senior to recommendee, but not in recommendee's chain of command", "junior to recommendee, but recommendee not in chain of command", "worked with recommendee in the same group", and "worked with recommendee in different groups".

Conventional terms in the fields of computer networking and computer systems have been used herein. The terms are known in the art and are provided only as a non-limiting example for convenience purposes. Accordingly, the interpretation of the corresponding terms in the claims, unless stated otherwise, is not limited to any particular definition.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

What is claimed is:

1. A method comprising:
    incorporating one or more modules into an online social networking service to improve a capability of the online networking service to identify a content item stored in a database of the online social networking service as a spam content item, the one or more modules configuring one or more computer processors of the online social networking service to perform operations, the operations comprising:
    generating a recommendation graph represented as a matrix listing vertices on both the vertical and horizontal axes and edges as entries corresponding to an intersection of the vertices, each of the vertices representing respective electronic profiles of members of the social networking service, each of the edges representing a recommendation of a recommendee member of the social networking service by a recommender member of the social networking service;
    training a reputation model to learn a respective importance for each respective feature of a subset of features of the electronic profiles, the training including providing the generated recommendation graph to a classifier;
    estimating a professional reputation of a member, the estimating including applying the trained reputation model to a feature vector of the member, the feature vector including feature values for the subset of the features, the applying including adjusting at least one of the feature values by a respective weight corresponding to the respective learned importance of the respective feature;
    aggregating a set of estimated professional reputations of members that have engaged with the content item stored in the database of the online social networking service;
    performing the identifying based on the aggregated set of estimated professional reputations; and
    determining a target audience for the content item based on the identifying.

2. The method of claim 1, wherein at least one of the edges is associated with a label designated by the recommender member and accepted by the recommendee member;
    wherein the label describes a professional relationship between the recommender member and the recommendee member; and
    wherein the label is one of "managed recommendee directly", "reported directly to recommendee", "managed recommendee indirectly", "reported indirectly to recommendee", "senior to recommendee, but not in recommendee's chain of command", "junior to recommendee, but recommendee not in chain of command", "worked with recommendee in the same group", and "worked with recommendee in different groups".

3. The method of claim 1, wherein the subset of features includes at least one of age, gender, industry, job title, location, employer, employer size, position in the recommendation graph, title-based seniority, title-based seniority of similar members, length of professional career, length of membership in the online social networking service, and degree obtained.

4. The method of claim 1, wherein the training includes providing a plurality of recommender-recommendee vertex pairs to the classifier, each recommender-recommendee vertex pair in the plurality connected by an edge in the recommendation graph and including features of the recommender member and features of the recommendee member.

5. The method of claim 1, wherein the training includes providing a plurality of feature vectors to the classifier, each respective feature vector of the plurality of feature vectors including:
    features of a respective recommender member and features of a respective recommendee member, the respective recommender member connected by an edge to the respective recommendee member; and
    features of interactions between the respective recommender member and the respective recommendee member.

6. The method of claim 1, wherein the estimated professional reputation of the member corresponds to a level of seniority of the member.

7. The method of claim 1, wherein the vertices of the generated recommendation graph include only members of the online social networking service having an electronic profile indicating involvement in a particular industry.

8. The method of claim 1, wherein the estimate of the professional reputation of the member is represented as a numerical score.

9. The method of claim 1, wherein training includes projecting the generated recommendation graph onto one dimension, the projecting using at least one of principal component analysis and a PageRank algorithm.

10. The method of claim 9, wherein projecting includes the classifier using logistic regression to project the generated recommendation graph onto one dimension.

11. A system comprising:
    one or more computer processors;
    one or more modules incorporated into an online social networking service to improve a capability of the online networking service to identify a content item stored in a database of the online social networking service as a spam content item, the one or more modules configuring the one or more computer processors to perform operations, the operations comprising:
    generating a recommendation graph represented as a matrix listing vertices on both the vertical and horizontal axes and edges as entries corresponding to an intersection of the vertices, each of the vertices representing respective electronic profiles of members of the social networking service, each of the edges representing a recommendation of a recommendee member of the social networking service by a recommender member of the social networking service;
    training a reputation model to learn a respective importance for each respective feature of a subset of features of the electronic profiles, the training including providing the generated recommendation graph to a classifier;
    estimating a professional reputation of a member, the estimating including applying the trained reputation model to a feature vector of the member, the feature vector including feature values for the subset of the features, the applying including adjusting at least one of the feature values by a respective weight corresponding to the respective learned importance of the respective feature;
    aggregating a set of estimated professional reputations of members that have engaged with the content item stored in the database of the online social networking service;
    performing the identifying based on the aggregated set of estimated professional reputations; and
    determining a target audience for the content item based on the identifying.

12. The system of claim 11, wherein at least one of the edges is associated with a label designated by the recommender member and accepted by the recommendee member;
    wherein the label describes a professional relationship between the recommender member and the recommendee member; and
    wherein the label is one of "managed recommendee directly", "reported directly to recommendee", "managed recommendee indirectly", "reported indirectly to recommendee", "senior to recommendee, but not in recommendee's chain of command", "junior to recommendee, but recommendee not in chain of command", "worked with recommendee in the same group", and "worked with recommendee in different groups".

13. The system of claim 11, wherein the subset of features includes at least one of age, gender, industry, job title, location, employer, employer size, position in the recommendation graph, title-based seniority, title-based seniority of similar members, length of professional career, length of membership in the online social networking service, and degree obtained.

14. The system of claim 11, wherein the estimated professional reputation of the member corresponds to a level of seniority of the member.

15. The system of claim 11, wherein the vertices of the generated recommendation graph include only members of the online social networking service having an electronic profile indicating involvement in a particular industry.

16. The system of claim 11, wherein the estimate of the professional reputation of the member is represented as a numerical score.

17. The system of claim 11, wherein training includes projecting the generated recommendation graph onto one dimension, the projecting using at least one of principal component analysis and a PageRank algorithm.

18. A non-transitory machine-readable storage medium including instructions, which, when executed by one or more computer processor of a machine, cause the machine to perform operations, the operations comprising:
    generating a recommendation graph represented as a matrix listing vertices on both the vertical and horizontal axes and edges as entries corresponding to an intersection of the vertices, each of the vertices representing respective electronic profiles of members of the social networking service, each of the edges representing a recommendation of a recommendee member of the social networking service by a recommender member of the social networking service;
    training a reputation model to learn a respective importance for each respective feature of a subset of features of the electronic profiles, the training including providing the generated recommendation graph to a classifier;
    estimating a professional reputation of a member, the estimating including applying the trained reputation model to a feature vector of the member, the feature vector including feature values for the subset of the features, the applying including adjusting at least one of the feature values by a respective weight corresponding to the respective learned importance of the respective feature;

aggregating a set of estimated professional reputations of members that have engaged with the content item stored in the database of the online social networking service;

performing the identifying based on the aggregated set of estimated professional reputations; and determining a target audience for the content item based on the identifying.

19. The non-transitory machine-readable storage medium of claim 18, wherein at least one of the edges is associated with a label designated by the recommender member and accepted by the recommendee member;

wherein the label describes a professional relationship between the recommender member and the recommendee member; and wherein the label is one of "managed recommendee directly", "reported directly to recommendee", "managed recommendee indirectly", "reported indirectly to recommendee", "senior to recommendee, but not in recommendee's chain of command", "junior to recommendee, but recommendee not in chain of command", "worked with recommendee in the same group", and "worked with recommendee in different groups".

* * * * *

UNITED STATES PATENT AND TRADEMARK OFFICE
CERTIFICATE OF CORRECTION

PATENT NO. : 9,792,588 B2  
APPLICATION NO. : 14/788031  
DATED : October 17, 2017  
INVENTOR(S) : Rodriguez et al.

Page 1 of 1

It is certified that error appears in the above-identified patent and that said Letters Patent is hereby corrected as shown below:

In the Claims

In Column 18, Line 46, in Claim 18, delete "Anon-transitory" and insert --A non-transitory-- therefor Signed and Sealed this
Twenty-eighth Day of May, 2019

Andrei Iancu
*Director of the United States Patent and Trademark Office*